United States Patent [19]
Horton

[11] Patent Number: 5,829,649
[45] Date of Patent: Nov. 3, 1998

[54] APPARATUS FOR CONDITIONING AND DISPENSING LOOSE FILL INSULATION MATERIAL

[75] Inventor: Paul H. Horton, Hollis, Okla.

[73] Assignee: Western Fibers, Inc., Hollis, Okla.

[21] Appl. No.: 224,090

[22] Filed: Apr. 5, 1994

Related U.S. Application Data

[63] Continuation of Ser. No. 17,549, Feb. 16, 1993, abandoned.

[51] Int. Cl.$^6$ .............................. B02C 17/16; B65G 53/40
[52] U.S. Cl. ............................ 222/636; 222/238; 241/60; 241/195; 366/300; 366/325.2; 366/325.3; 406/39; 406/135
[58] Field of Search .............................. 366/66, 133, 168, 366/177, 181, 186, 194–196, 292, 297–301, 318, 319, 321, 325, 603; 241/60, 195, 605; 406/39, 64, 65, 67, 135; 222/227, 238, 630, 636; 198/530, 533, 537

[56] References Cited

U.S. PATENT DOCUMENTS

| | | | |
|---|---|---|---|
| 1,413,345 | 4/1922 | Morris .................................. | 366/298 X |
| 2,306,698 | 12/1942 | Heller .................................. | 366/298 X |
| 2,517,903 | 8/1950 | Luhrmann ............................. | 241/60 X |
| 2,550,354 | 4/1951 | Jacobsen .................................... | 406/65 |
| 2,861,294 | 11/1958 | Glaxner et al. ...................... | 366/177 X |
| 3,244,408 | 4/1966 | Brownlie et al. ........................ | 366/300 |
| 3,529,870 | 9/1970 | Woten .................................... | 406/65 X |
| 3,804,377 | 4/1974 | Kugle et al. . | |
| 3,807,646 | 4/1974 | Leiter et al. ............................... | 241/60 |
| 4,111,493 | 9/1978 | Sperber . | |
| 4,236,654 | 12/1980 | Mello ..................................... | 222/238 |
| 4,411,390 | 10/1983 | Woten ...................................... | 241/98 |
| 4,465,239 | 8/1984 | Woten ...................................... | 241/98 |
| 4,896,970 | 1/1990 | Schuler .................................. | 366/296 |
| 4,978,252 | 12/1990 | Sperber .................................... | 406/64 |
| 5,090,629 | 2/1992 | Pinto et al. .......................... | 241/282.1 |

FOREIGN PATENT DOCUMENTS

| | | | |
|---|---|---|---|
| 2099776 | 12/1982 | United Kingdom ................... | 241/605 |
| 2193478 | 2/1988 | United Kingdom .................... | 406/65 |

*Primary Examiner*—Charles E. Cooley
*Attorney, Agent, or Firm*—Dunlap & Codding, P.C

[57] ABSTRACT

A machine for conditioning and dispensing loose fill insulation material, such as cellulosic insulation, fiber glass insulation and rock wool insulation. The machine includes a hopper, a conditioning chamber, an air lock and a blower for pneumatically dispensing the material. The conditioning chamber is equipped with three rotating shafts with helically arranged spikes which serve as conveyors as well as dispersers. A lower conveyor shaft moves the material toward the opening into the air lock, while the two uppermost conveyor shafts move the material in the opposite direction. Thus, the same assembly which conveys the material to the air lock also conditions the material. Moreover, the counter current flow pattern churns or agitates the insulation material while the individual spikes disperse it. A single motor drives the rotation of the conveyor shafts and the rotation of the vanes in the air lock.

15 Claims, 3 Drawing Sheets

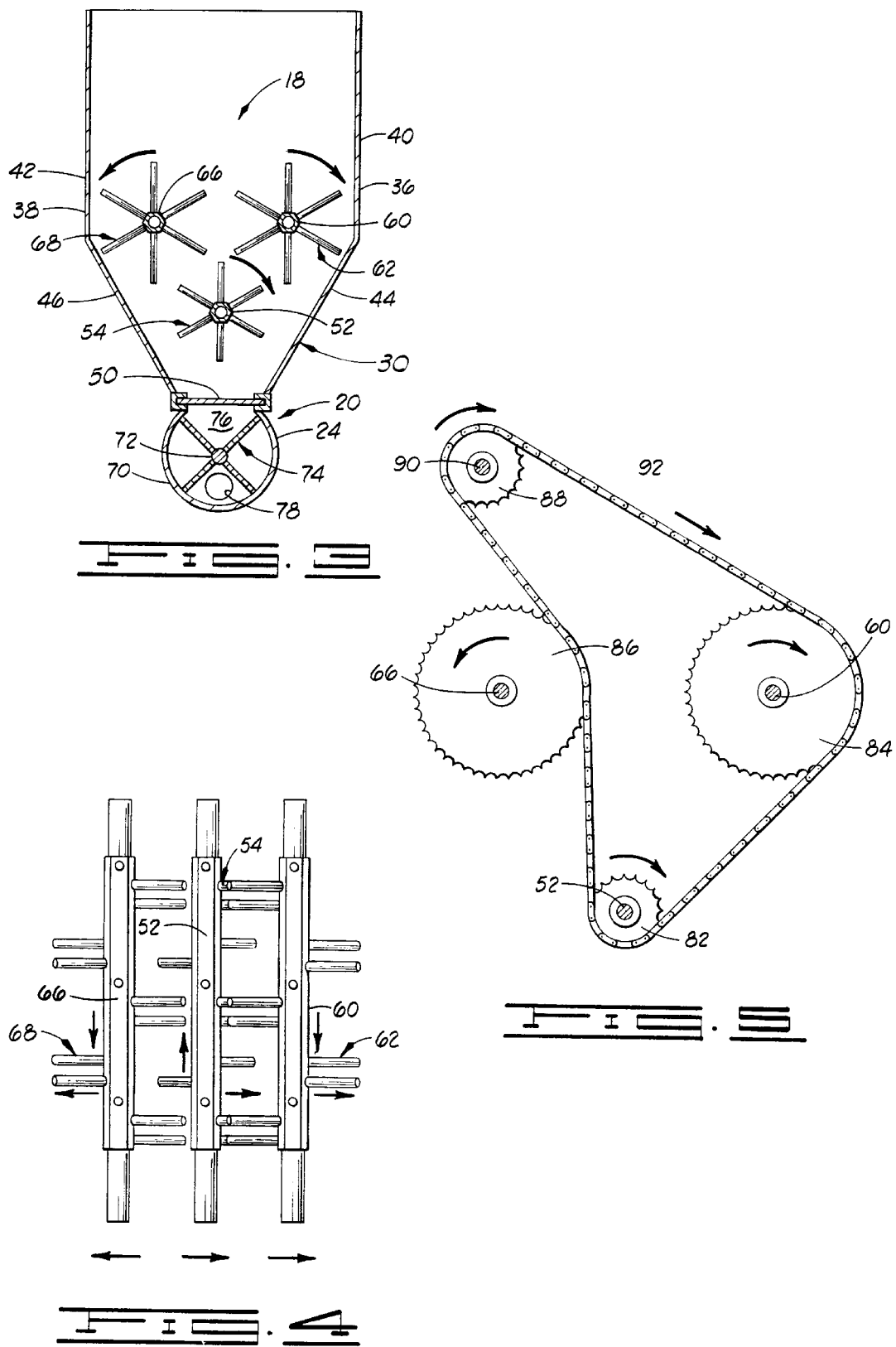

5,829,649

APPARATUS FOR CONDITIONING AND DISPENSING LOOSE FILL INSULATION MATERIAL

This is a continuation of application Ser. No. 08/017,549 filed on Feb. 16, 1993, now abandoned.

FIELD OF THE INVENTION

The present invention relates generally to machines for conditioning and dispensing insulation materials.

SUMMARY OF THE INVENTION

The present invention is directed to a machine for conditioning and dispensing loose fill insulation material. The machine comprises a hopper for receiving unconditioned insulation material and a conditioning apparatus for receiving the unconditioned insulation material from the hopper and for conditioning the insulation material. The machine further comprises a dispensing assembly for receiving the conditioned insulation material from the conditioning apparatus and for dispensing the conditioned insulation material to an applicator.

The conditioning apparatus comprises a housing for containing the insulation material. The housing has a first end, a second end, a first side and a second side, a top continuous with the hopper and defining an entry opening, a bottom continuous with the dispensing assembly and defining an exit opening.

A first shaft is supported longitudinally in the housing. The first shaft is mounted for rotation and comprises a plurality of spikes extending radially from the shaft in a helical pattern so that as the first shaft is rotated the spikes will disperse the insulation material and will convey the insulation material toward the exit opening.

A second shaft is supported longitudinally in the housing parallel to but a distance above the first shaft. The second shaft is mounted for rotation and comprises a plurality of spikes extending radially from the shaft in a helical pattern, so that as the second shaft is rotated the spikes will disperse the insulation material and convey the insulation material away from the exit opening in the bottom of the housing.

In the preferred embodiment, the second shaft is spaced closer to the first side than the second side of the housing and a third conveyor shaft is included. The third shaft is supported longitudinally in the housing parallel to but a distance above the first shaft and is spaced closer to the second side than to the first side of the housing. The third shaft is mounted for rotation and comprises a plurality of spikes extending radially from the shaft in a helical pattern, so that as the third shaft is rotated the spikes will disperse the insulation material and convey the insulation material away from the exit opening in the bottom of the housing.

A drive assembly is provided in the machine for driving the rotation of the shafts.

BRIEF DESCRIPTION OF THE DRAWINGS

FIG. 3 is a sectional view of the apparatus shown in FIG. 2 taken along line 3—3.

FIG. 4 is a plan view of the conveyor shafts of the apparatus showing the flow path of the insulation material as it is processed.

FIG. 5 is a side elevational view of the chain drive assembly for controlling the rotation of the conveyor shafts in the apparatus with arrows indicating the flow pattern of the material as it is processed.

DETAILED DESCRIPTION OF THE PREFERRED EMBODIMENT

Loose fill insulation material is packaged in large bags in which the material becomes compacted during storage and shipment. When removed from the bags, the material separates into large clumps. To install the material pneumatically, it first must be conditioned by breaking up or dispersing the clumps and "fluffing up" the material. The conditioned material then is applied pneumatically to the surface to be insulated. That is, the conditioned material is applied by blowing it into place using a large hose. Usually, the material is moistened during the blowing process, and it may be treated with an adhesive as well.

Well conditioned material applies more evenly and allows the moisture and adhesive to thoroughly and consistently penetrate the fibers. Thus, the conditioning of the insulation material is important as it significantly affects the performance of the applied insulation.

The present invention is directed to a machine comprising a highly efficient apparatus for conditioning loose fill insulation material, including cellulosic, rock wool and fiber glass insulation material. The machine includes a conditioning apparatus which extends across the bottom of the hopper and which provides multi-directional tumbling of the material while the individual spikes cut through and disperse the material. Thus, the entire bottom of the hopper is live. The conditioned fibers then are fed evenly into a dispensing assembly from which the conditioned material is applied to the surface to be insulated.

Figure 1:
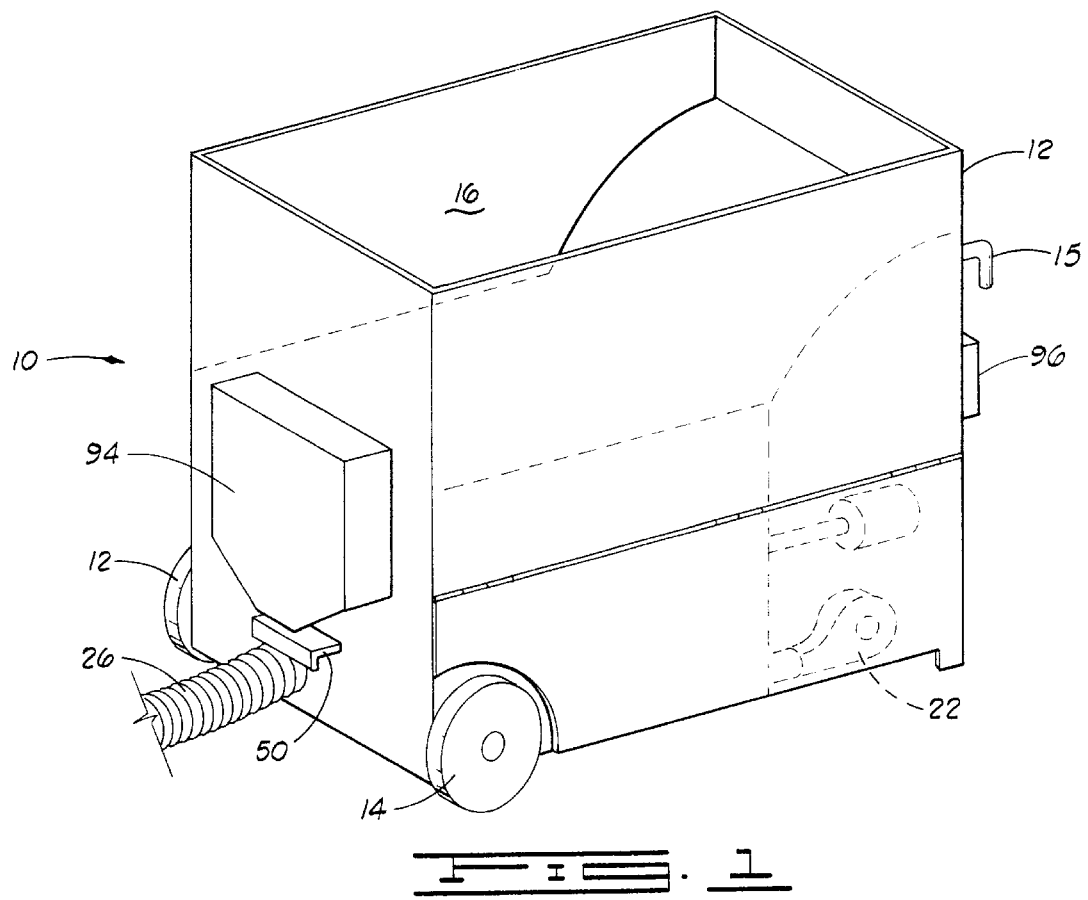
FIG. 1 is a perspective view of an apparatus constructed in accordance with the present invention for conditioning and dispensing loose fill insulation material.

With reference now to the drawings in general and to FIG. 1 in particular, there is shown therein a machine in accordance with the present invention. The machine is designated generally by the reference numeral 10.

The machine 10 generally comprises a housing 12. The housing 12 is equipped with wheels 14 at one end and a handle 15 at the other end for moving the machine 10. The upper portion of the machine 10 defines a hopper 16 for receiving unconditioned insulation material.

Figure 2:
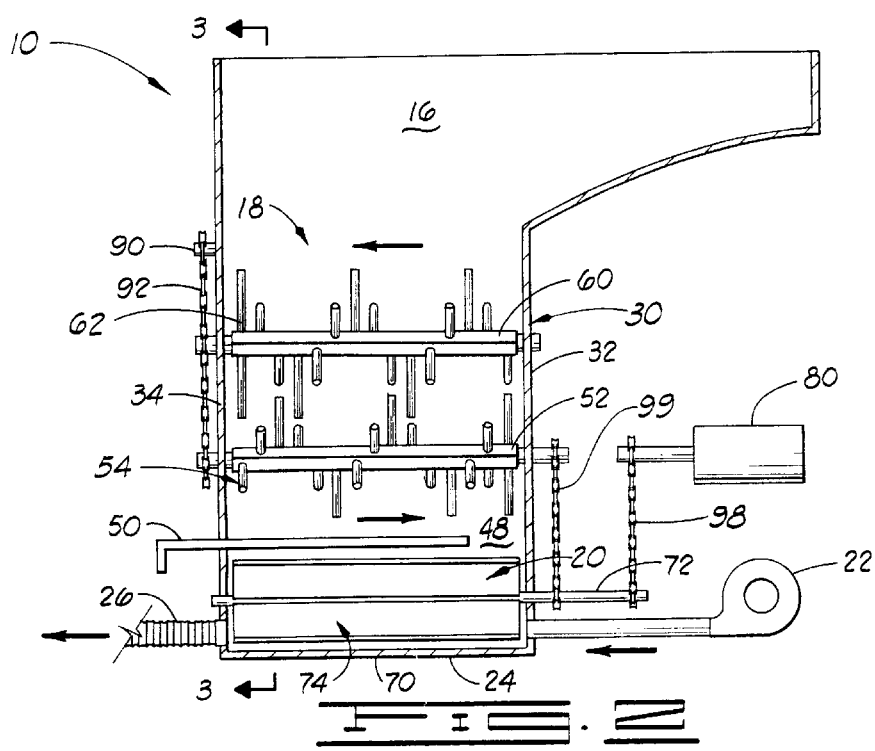
FIG. 2 is a side view of the internal structure of the apparatus shown in FIG. 1. The controls, cover panels, wheels and handle are not shown to simplify the illustration.

Referring now also to FIG. 2, the machine 10 further comprises a conditioning apparatus 18 which is positioned beneath the hopper 16. The conditioning apparatus 18 receives unconditioned insulation material from the hopper 16 and feeds it to a dispensing assembly 20 positioned below the conditioning apparatus. The conditioned insulation material is blown by the blowers 22 through an air lock chamber 24 Into a hose 26. An applicator of some sort (not shown) is attached at the end of the hose 26 for applying the material to the surface to be insulated (not shown).

With continuing reference to FIG. 2 and referring also to FIG. 3, the conditioning apparatus 18 will be described in detail. The conditioning apparatus 18 includes a housing 30 for containing the unconditioned insulation material which is fed by gravity from the hopper 16 immediately above it. The housing 30 preferably is formed by a portion of the housing 12 of the machine 10. The vertical walls of the housing 30 are defined by a first end 32, a second end 34, a first side 36 and a second side 38. The sides 36 and 38 have upper portions 40 and 42 continuous with the hopper 16 and normal to the surface to be treated. The sides 36 and 38 have lower portions 44 and 46 which converge to form a funnel with the vertical end walls 32 and 34 for feeding the insulation material to the dispensing assembly 20 below. The bottom of the housing 30 defines an exit opening 48. The size of the exit opening 48 is controlled by a slide panel 50.

Referring still to FIGS. 2 and 3, the conditioning apparatus 18 includes a first shaft 52 supported longitudinally in the housing 30 a distance above the slide panel 50 and preferably an equal distance between the converging lower portions 44 and 46 of the sides 36 and 38. The first shaft 52 is mounted for rotation to be driven by a conventional chain drive system yet to be described.

As best seen in FIGS. 2 and 4, The first shaft 52 has a plurality of spikes 54 extending radially from it in a helical pattern which forms a left-handed conveyer. In this way, when the shaft 52 is rotated towards the first side 36, as indicated in FIG. 3, insulation material surrounding the shaft is conveyed toward the opening 48 (FIG. 2) near the first end 32 of the housing 30. The spikes 54 also condition the material by cutting through and dispersing the fibers into smaller clumps.

A second shaft 60 is supported longitudinally in the housing 30 parallel to but a distance above the first shaft 52. The second shaft 60 preferably is closer to the first side 36 than the second side 38. The second shaft 60 also is mounted for rotation and also has a plurality of spikes 62 extending radially from it in a helical pattern to form a right-handed conveyor, as best seen in FIGS. 2 and 4. Thus, if the second shaft 62 is rotated toward the first side 36, as indicated in FIG. 3, the insulation material will be rolled toward the first side 36 and conveyed toward the second end 34 away from the exit opening 48 (FIG. 2).

With continuing reference to FIGS. 3 and 4, a third shaft 66 preferably is rotatably supported in the housing 30 parallel to and at the same level as the second shaft 60. The third shaft 66, then, is closer to the second side 38 than the first side 36. A plurality of spikes 68 extend radially from the third shaft in a helical pattern to form a left-handed conveyor. Thus, when the third shaft 66 is rotated toward the second side 38 as shown in FIG. 3, insulation material surrounding the shaft is rolled toward the second side 38 and conveyed toward the second end 34 (FIG. 2).

In other words, the second and third shafts 60 and 66 direct the insulation material towards opposite sides but towards the same end of the housing. On the other hand, the upper (second and third) shafts 60 and 66 convey the material in a direction opposite to the lower (first) shaft 52. This counter-current flow pattern created by the upper and lower shafts 52, 60 and 66 churns and agitates the insulation material inside the housing and thus contributes to the dispersal of the fibers.

The dimensions of the housing 30, the shafts 52, 60 and 66 and the spikes 54, 62 and 68, respectively, as well as the pitch of the conveyors, may vary. However, in the preferred practice of this invention the shafts, spikes and the housing will be sized so that there is approximately one-half inch space between the ends of the spikes and the sides of the housing and approximately one inch between the ends of the spikes on adjacent shafts. This will ensure that all of the insulation material inside the housing 30 will be thoroughly conditioned.

Now it will be understood that in other embodiments contemplated by this invention, the direction of rotation or orientation of the conveyor shafts, or both, may be changed. For example, in some instances it may be desired to reverse the direction of rotation of the upper (second and third) conveyor shafts 60 and 66 so that instead of rolling the material toward the sides 36 and 38 of the housing 30 the upper shafts will roll the material towards the center of the housing. Alternately, by using a left-handed conveyor adjacent the first side 36 and a right-handed conveyor adjacent the second side 38 and rotating the shafts in directions opposite to those shown in the drawings herein, rotation will result in material being conveyed toward the second end as in the embodiment shown and described herein.

The orientation (right-hand or left-hand) of the lower (first) shaft 52 may be varied also. For example, if the lower shaft 52 is right-handed, as opposed to left-handed as shown herein, the lower shaft could be rotated in a counter-clockwise direction to achieve the same direction of flow as rotating a left-handed shaft in a clockwise direction.

Notwithstanding the above, it is a feature of the present invention that the upper shafts 60 and 66 both convey material in a direction opposite to the direction in which the lower (first) shaft 52 conveys the material. The orientation and the rotation direction of each of the three shafts should be selected to achieve this result.

Referring again to FIGS. 2 and 3, the dispensing assembly 20 will be reviewed. The dispensing assembly 20 preferably comprises a rotary pocket feeder type apparatus, also known as a vacuum feeder, vacuum dropper or vane feeder. As this type of device is well known, it will not be described in great detail. The rotary pocket feeder includes the air lock chamber 24 defined by a cylinder 70 which preferably is supported below the housing 30 of the conditioning apparatus 18. A shaft 72 is rotatably mounted longitudinally in the cylinder 70. A plurality of blades or vanes 74 extend radially from the shaft 72, the edges of the vanes 74 contacting the inner wall of the cylinder 70 to create pockets 76, as best seen in FIG. 3.

As the shaft 72 is rotated, amounts of conditioned insulation material are received in each pocket through the opening 48 as the pocket rotates past the opening. The amount of material entering each pocket may be controlled by adjusting the position of the slide panel 50. Airflow from the blower 22 enters the air lock cylinder 70 through a hole 78 (FIG. 3) near the bottom and forces the material in the pocket into the hose 26 (FIG. 2) through which it is transported to an applicator device (not shown) in a known manner.

Now another advantage of the spiked conveyors 52, 60 and 66 will be appreciated. Regardless of the size of the exit opening 48, insulation material will not become clogged around the lower conveyor 52. This is because when emptying of the housing 30 is slowed, the spikes simply cut through the material rather than creating a clog at one end of the housing as might another type of conveyor.

Rotation of the conveyor shafts 52, 60 and 66 and the shaft 72 of the rotary pocket feeder of the dispensing assembly 20 may be driven efficiently by a single motor 80 (FIG. 2) and a series of chains and sprocket wheels. An exemplary drive assembly is shown in FIG. 5, to which attention now is directed.

As described above, it is preferred that the two upper conveyor shafts 60 and 66 turn towards the first side 36 and second side 38, respectively, or clockwise and counter-clockwise when viewed from the second end 34. The lower (third) shaft 52 may turn towards either wall, so long as it conveys the material toward the first end 32 of the housing 30 or towards the exit opening 48. In the embodiment shown, the lower (first) shaft 52 is rotated in the same direction as the second shaft 66. Each of the shafts 52, 60 and 66 is provided with a sprocket wheel 82, 84 and 86, mounted on the outside of the second end 34 of the housing 30 (FIG. 2). A fourth sprocket wheel 88 is mounted on a "dummy" shaft 90. A single chain 92 then can be mounted on the sprocket wheels 82, 84, 86 and 88, which will cause the shafts 52, 60 and 66 to turn in the desired directions. It will be noted that by placing the chain 92 on the outside of the wheel 86 and the inside of the wheel 84, the shafts 60 and 66 will be caused to turn in the opposite directions.

A removable protective cover 94 preferably is attached to the housing 12 (FIG. 1) to cover the drive assembly. A control panel 96 also is mounted in some convenient location on the housing 12 for containing the controls which operate the motor 80 and the blower 22.

As shown in FIG. 2, the motor 80 drives the rotation of the shaft 72 in the dispensing assembly 20 by means of a chain 98 and a sprocket wheel (not shown). A second sprocket wheel (not shown) is mounted on the shaft 72 and is drivingly connected to a sprocket wheel (not shown) on the first end of the shaft 52, so that the shaft 52 is driven by the same motor 80 by using another chain 99.

The size and type of motor, as well as the size of the various chains and sprocket wheels, are selected to provide a desired rotation rate. In most instances, it will be preferred that the lower (first) conveyer shaft 52 turn at a greater rate than the two upper (second and third) shafts 60 and 66, and most preferably the lower shaft will rotate about twice as fast as the upper shafts. Furthermore, the speed of rotation may in part be determined by the pitch of the conveyors. The motor, the various sprocket wheels and chains should be selected accordingly. In most instances a ¾ horsepower motor which operates on 220/240 household current will be sufficient.

Figure 6:
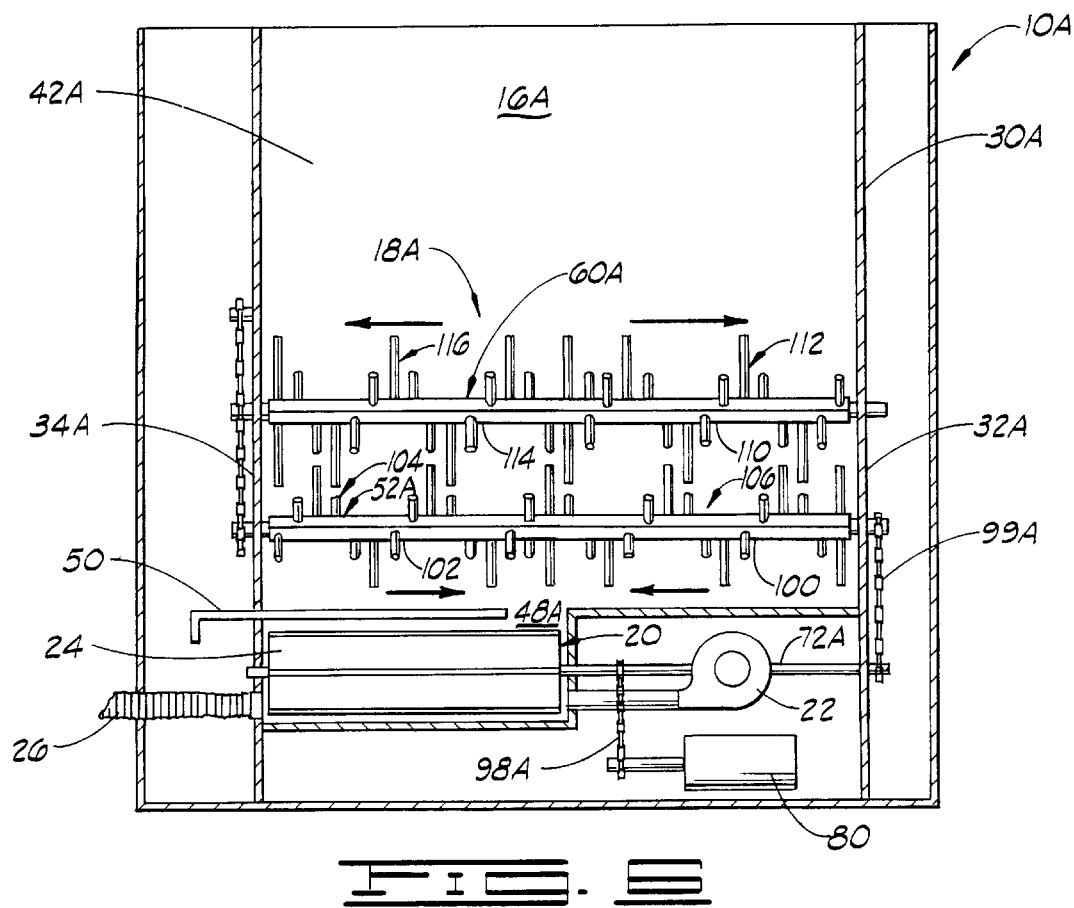
FIG. 6 is a side view of the internal structure of a second embodiment of the present invention in which the conveyor shafts extend the length of the machine and are bidirectional. As in FIG. 2, the controls, cover panels, wheels and handle are not shown.
Figure 7:
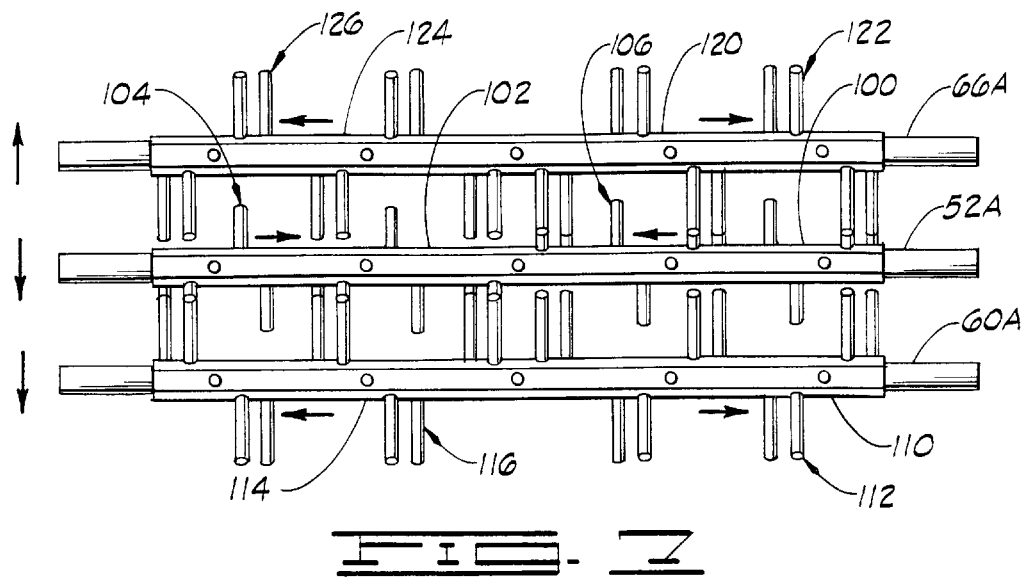
FIG. 7 is a plan view of the conveyor shafts of the embodiment shown in FIG. 6 with arrows indicating the flow pattern of the material as it is processed.

Attention now is directed to FIGS. 6 and 7 which depict another embodiment of the invention. In this embodiment the machine 10A is approximately the same size and utilizes a similar dispensing assembly 20, blower 22 and motor 80. However, the hopper 16A and the shafts 52A, 60A and 66A (FIG. 3 only) in this embodiment are nearly as long as the machine, so that the exit opening 48A into the dispensing assembly 20 is positioned under the midportions of the shafts 52A, 60A and 66A.

The shaft 52A has a first longitudinal section 100 which extends from the first end 32A of the housing 30A to a point generally over the area of the exit opening 48A. The shaft 52A has a second longitudinal section 102 which extends from the second end 34A to the first longitudinal section 100. The spikes 104 on the second longitudinal section 102 are arranged helically to form a left-handed conveyer similar to the spikes 54 on the first shaft 52 of the embodiment of FIGS. 1–5. The spikes 106 on the first longitudinal section 100 are oppositely oriented to the spikes 104 on the second longitudinal section 102, to form a right-handed conveyor.

In this way, when the shaft 52A is rotated clockwise insulation material surrounding the first longitudinal section 100 will be conveyed toward the second end 34A and material surrounding the second longitudinal section 102 will be conveyed toward the first end 32A. In other words, both sections 100 and 102 will convey the material generally toward the center of the housing 30A over the exit opening 48A.

The second shaft 60A has a first longitudinal section 110 with spikes 112 arranged to form a left-handed conveyor and a second longitudinal section 114 with spikes 116 to form a right-handed conveyor. The third shaft 66A (FIG. 7 only) has a first longitudinal section 120 with spikes 122 to form a right-handed conveyor and a second longitudinal section 124 with spikes 126 to form a left-handed conveyor.

In this way, when the shaft 60A is rotated clockwise and the shaft 66A is rotated counter-clockwise (when viewed from the second end), insulation material surrounding the first longitudinal sections 110 and 120 will be conveyed toward the first end 32A, and material surrounding the second longitudinal sections 114 and 124 will be conveyed toward the second end 34A. In other words, the shafts 60A and 66A both convey material from the center of the housing 30A to the ends 32A and 34A and away from the exit opening 48A.

It will also be understood that material along the length of the shaft 60A, that is, around the first and second longitudinal sections 110 and 114, will be turned or rolled toward the adjacent side (not shown) of the hopper 16A. Similarly, material along the length of the shaft 66A, that is, around the first and second longitudinal sections 120 and 124, will be turned or rolled toward the adjacent side 42A of the hopper 16A.

The rotation of the shafts 52A, 60A and 66A is driven by a system of chains and sprockets similar to that of the previously described embodiment shown in FIG. 4 and will not be repeated here. As shown in FIG. 6, the motor 80 drives the rotation of the shaft 72A of the dispensing assembly 20 by means of a chain 98A. Rotation of the shaft 72A drives the rotation of the shaft 52A by means of the chain 99A.

Now it will be appreciated that an important advantage of the present invention is that the same mechanism which conveys the insulation material from the hopper to the dispensing assembly also conditions the material. This simplifies the construction and operation of the machine. Another important advantage of this invention is the improved conditioning made possible by the multi-directional conveyor shafts and the counter-current flow pattern produced by them. Overall, machines constructed in accordance with this invention are highly efficient and can process 120 to 150 25-pound bags of cellulosic insulation per hour.

Changes may be made in the combination and arrangement of the various parts, elements, steps and procedures described herein without departing from the spirit and scope of the invention as defined in the following claims.

I claim:

1. A machine for conditioning and dispensing loose fill insulation material, comprising:

a hopper for receiving unconditioned insulation material;

a conditioning apparatus for receiving the unconditioned insulation material from the hopper and for conditioning the insulation material;

a dispensing assembly for receiving the conditioned insulation material from the conditioning apparatus and for dispensing the conditioned insulation material to an applicator; and wherein the conditioning apparatus comprises:

a housing for containing the insulation material, the housing having a first end, a second end, a first side, a second side, a top continuous with the hopper and defining an entry opening, and a bottom continuous with the dispensing assembly and having a length defined by the distance between the first and second ends;

a movable partition in the bottom of the housing adapted to form an adjustable exit opening whereby the flow of conditioned insulation material from the housing into the dispensing assembly is controlled, the exit opening having a length less than the length of the bottom of the housing;

a first shaft supported longitudinally in the housing, wherein the first shaft is rotatably mounted and comprises a plurality of spikes extending radially therefrom in a helical pattern, so that as the first shaft is rotated the spikes disperse the insulation material and convey the insulation material toward the exit opening in the bottom of the housing;

a second shaft supported longitudinally in the housing, the second shaft being parallel to but a distance above the first shaft, wherein the second shaft is rotatable mounted and comprises a plurality of spikes extending radially therefrom in a helical pattern, so that as the second shaft is rotated the spikes disperse the insulation material and convey the insulation material away from the exit opening in the bottom of the housing; and a drive assembly for driving the rotation of the first and second shafts;

wherein the exit opening in the bottom of the housing is spaced a distance between the first and second ends of the housing, and wherein each of the first and second shafts comprises a first longitudinal section extending from the first end to a point over the exit opening and having a first helical pattern, and a second longitudinal section extending from the second end to a point over the exit opening and having a second helical pattern, wherein the first and second helical patterns of the first and second sections of each of said first and second shafts are oppositely oriented so that as the first shaft is rotated the first and second sections convey the insulation material from the first and second ends of the housing toward the exit opening, and so that as the second shaft is rotated the first and second sections convey the insulation material away from the exit opening and toward the first and second ends of the housing.

2. The machine of claim 1 wherein the second shaft is spaced closer to the first side than the second side of the housing, wherein the conditioning apparatus further comprises:

a third shaft supported longitudinally in the housing, the third shaft being parallel to but a distance above the first shaft and spaced closer to the second side than to the first side of the housing, wherein the third shaft is rotatably mounted and comprises a plurality of spikes extending radially therefrom so that as the third shaft is rotated the spikes disperse the insulation material, wherein the third shaft comprises a first longitudinal section extending from the first end to a point over the exit opening and wherein the spikes thereon form a first helical pattern and a second longitudinal section extending from the second end to a point over the exit opening and wherein the spikes thereon form a second helical pattern, wherein the first and second helical patterns of the first and second sections are oppositely oriented so that as the third shaft is rotated the first and second sections convey the insulation material away from the exit opening in the bottom of the housing toward the first and second ends of the housing; and wherein the drive assembly also drives the rotation of the third shaft.

3. The machine of claim 2 wherein the drive assembly rotates the second and third shafts in opposite directions.

4. The machine of claim 2 wherein the drive assembly rotates the second and third shafts in opposite directions and wherein the second shaft rolls the insulation material toward the first side of the housing and the third shaft rolls insulation material toward the second side of the housing.

5. The machine of claim 2 wherein the second and third shafts are the same distance above the first shaft.

6. A machine for conditioning and dispensing loose fill insulation material, comprising:

a hopper for receiving unconditioned insulation material;

a conditioning apparatus for receiving the unconditioned insulation material from the hopper and for conditioning the insulation material;

a dispensing assembly for receiving the conditioned insulation material from the conditioning apparatus and for dispensing the conditioned insulation material to an applicator;

wherein the conditioning apparatus comprises:

a housing for containing the insulation material, the housing having a first end, a second end, a first side, a second side, an open top continuous with the hopper, and a bottom continuous with the dispensing assembly and having a length defined by the distance between the first and second ends;

a movable partition in the bottom adapted to form an adjustable exit opening whereby the flow of conditioned insulation material from the housing into the dispensing assembly is controlled, the exit opening having a length less than the length of the bottom of the housing;

a first shaft supported longitudinally in the housing, the first shaft being mounted for rotation and comprising a plurality of spikes extending radially therefrom in a helical pattern which forms a left-handed conveyor;

a second shaft supported longitudinally in the housing, the second shaft being parallel to but a distance above the first shaft and spaced closer to the first side than the second side of the housing, the second shaft being mounted for rotation and comprising a plurality of spikes extending radially therefrom in a helical pattern to form a right-handed conveyor;

a third shaft supported longitudinally in the housing, the third shaft being parallel to but a distance above the first shaft and spaced closer to the second side than to the first side of the housing, the third shaft being mounted for rotation and comprising a plurality of spikes extending radially therefrom in a helical pattern to form a left-handed conveyor;

wherein the first shaft is rotated in a direction to convey the material towards the exit opening, and wherein the second shaft is rotated to convey the insulation material away from the exit opening and to roll it toward the first side, and wherein the third shaft is rotated to convey the material away from the exit opening and to roll it toward the second side; and a drive assembly for driving the rotation of the first, second and third shafts.

7. The machine of claim 6 wherein the dispensing assembly comprises a rotary pocket feeder assembly and wherein the drive assembly which drives the rotation of the first, second and third shafts also drives the rotary pocket feeder.

8. The machine of claim 6 wherein the hopper is positioned above the conditioning apparatus so that insulation material in the hopper is fed by gravity toward the conditioning apparatus.

9. The machine of claim 6 wherein the conditioning apparatus is positioned above the dispensing assembly so that insulation material is fed by gravity into the dispensing assembly.

10. A machine for conditioning and dispensing loose fill insulation material, comprising:

a hopper for receiving unconditioned insulation material;

a conditioning apparatus for receiving the unconditioned insulation material from the hopper and for conditioning the insulation material;

a dispensing assembly for receiving the conditioned insulation material from the conditioning apparatus and for dispensing the conditioned insulation material to an applicator; and wherein the conditioning apparatus comprises:

a housing for containing the insulation material, the housing having a first end, a second end, a first side, a second side, a top continuous with the hopper and defining an entry opening, and a bottom continuous with the dispensing assembly and having a length defined by the distance between the first and second ends;

a movable partition in the bottom of the housing adapted to form an adjustable exit opening whereby the flow of conditioned insulation material from the housing into the dispensing assembly is controlled, the exit opening having a length less than the length of the bottom of the housing;

a first shaft supported longitudinally in the housing, wherein the first shaft is rotatably mounted and comprises a plurality of spikes extending radially therefrom in a helical pattern, so that as the first shaft is rotated the spikes disperse the insulation material and convey the insulation material toward the exit opening in the bottom of the housing;

a second shaft supported longitudinally in the housing, the second shaft being parallel to but a distance above the first shaft and spaced closer to the first side than the second side of the housing, wherein the second shaft is rotatably mounted and comprises a plurality of spikes extending radially therefrom in a helical pattern, so that as the second shaft is rotated the spikes disperse the insulation material and convey the insulation material away from the exit opening in the bottom of the housing;

a third shaft supported longitudinally in the housing, the third shaft being parallel to but a distance above the first shaft and spaced closer to the second side than to the first side of the housing, wherein the third shaft is rotatably mounted and comprises a plurality of spikes extending radially therefrom in a helical pattern so that as the third shaft is rotated the spikes disperse the insulation material and convey the insulation material away from the exit opening in the bottom of the housing; and a drive assembly for driving the rotation of the first and second shafts.

11. The machine of claim 10 wherein the drive assembly rotates the second and third shafts in opposite directions.

12. The machine of claim 10 wherein the drive assembly rotates the second and third shafts in opposite directions and wherein the second shaft rolls the insulation material toward the first side of the housing and the third shaft rolls insulation material toward the second side of the housing.

13. The machine of claim 10 wherein the second shaft rolls insulation material toward the first side of the housing and wherein the third shaft rolls insulation material toward the second side of the housing.

14. The machine of claim 10 wherein the dispensing assembly comprises a rotary pocket feeder assembly and wherein the drive assembly which drives the rotation of the first, second and third shafts also drives the rotary pocket feeder.

15. The machine of claim 10 wherein the dispensing assembly comprises a rotary pocket feeder assembly and wherein the drive assembly which drives the rotation of the first and second shafts also drives the rotary pocket feeder.

\* \* \* \* \*

UNITED STATES PATENT AND TRADEMARK OFFICE
CERTIFICATE OF CORRECTION

PATENT NO.     : 5,829,649

DATED          : November 3, 1998

INVENTOR(S)    : Horton

It is certified that error appears in the above-identified patent and that said Letters Patent is hereby corrected as shown below:

Column 5, line 9, "66" should be -- 60 --.

Signed and Sealed this

Seventeenth Day of October, 2000

Attest:

Q. TODD DICKINSON

*Attesting Officer*                *Director of Patents and Trademarks*